(12) United States Patent
Kunze et al.

(10) Patent No.: US 11,790,615 B2
(45) Date of Patent: Oct. 17, 2023

(54) MARKING OBJECTS FOR A VEHICLE USING A VIRTUAL ELEMENT

(71) Applicant: Volkswagen Aktiengesellschaft, Wolfsburg (DE)

(72) Inventors: Alexander Kunze, Berlin (DE); Matthias Schacht, Braunschweig (DE); Eduard Seib, Wolfsburg (DE); Johanna Sandbrink, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/535,414

(22) Filed: Nov. 24, 2021

(65) Prior Publication Data

US 2022/0165039 A1 May 26, 2022

(30) Foreign Application Priority Data

Nov. 26, 2020 (DE) .......................... 102020214843.0

(51) Int. Cl.
*G06T 19/00* (2011.01)
*B60K 35/00* (2006.01)

(52) U.S. Cl.
CPC ............ *G06T 19/006* (2013.01); *B60K 35/00* (2013.01); *B60K 2370/166* (2019.05); *B60K 2370/31* (2019.05); *B60K 2370/52* (2019.05)

(58) Field of Classification Search
None
See application file for complete search history.

(56) References Cited

U.S. PATENT DOCUMENTS

| 10,789,490 | B2 * | 9/2020 | Kleen | G02B 27/01 |
| 2002/0055808 | A1 | 5/2002 | Matsumoto | |
| 2016/0059697 | A1 | 3/2016 | Ann | |
| 2016/0357187 | A1 * | 12/2016 | Ansari | G06V 20/58 |
| 2017/0053444 | A1 * | 2/2017 | Huang | G06F 3/04842 |
| 2018/0157036 | A1 * | 6/2018 | Choi | G09G 3/001 |
| 2019/0005726 | A1 * | 1/2019 | Nakano | G06T 19/006 |
| 2019/0299855 | A1 * | 10/2019 | Ostapenko | G06T 19/006 |

FOREIGN PATENT DOCUMENTS

| DE | 102011007329 A1 | 10/2012 |
| DE | 102013215370 A1 | 2/2015 |
| DE | 102013016242 A1 | 4/2015 |

(Continued)

OTHER PUBLICATIONS

DE102020214843.0. Examination Report (dated Aug. 6, 2021).

(Continued)

*Primary Examiner* — Jason A Pringle-Parker
(74) *Attorney, Agent, or Firm* — Peter Zura; LOZA & LOZA, LLP

(57) ABSTRACT

Technologies and techniques for representing at least one virtual element in a display area of at least one display device of a vehicle. The display area of a display device is used as efficiently as possible, so that the driver of the vehicle is afforded a clear representation of the information needed and the driver is not unnecessarily diverted, it is provided that virtual elements of at least one first vehicle are marked and represented in the display area of the display device.

16 Claims, 3 Drawing Sheets

(56) References Cited

FOREIGN PATENT DOCUMENTS

| | | |
|---|---|---|
| DE | 102014119317 A1 | 6/2016 |
| DE | 102017216774 A1 | 3/2019 |
| DE | 102018203462 A1 | 9/2019 |
| DE | 102018204254 A1 | 9/2019 |
| EP | 1785326 A1 | 5/2007 |
| EP | 3150443 A1 | 4/2017 |
| EP | 3357733 B1 | 8/2018 |
| JP | 11053699 A | 2/1999 |
| JP | 11339192 A | 12/1999 |
| JP | 2017092678 A | 5/2017 |

OTHER PUBLICATIONS

EP Serial No. 2120806.7. Extended Search Report (dated Apr. 20, 2022).
Wired. "With In-Car AR, Drivers get a new view of the road ahead". (Dec. 2, 2020).
Wikipedia "Notbremsassistent" (Translation: Emergency Brake Assistant). (downloaded Apr. 12, 2022).

\* cited by examiner

MARKING OBJECTS FOR A VEHICLE USING A VIRTUAL ELEMENT

CROSS REFERENCE TO RELATED APPLICATION

The present application claims priority to German Patent App. No 10 2020 214 843.0, filed Nov. 26, 2020, the contents of which is incorporated by reference in its entirety herein.

FIELD OF TECHNOLOGY

The present disclosure is directed to technologies and techniques for representing at least one virtual element in a display area of at least one display device of a vehicle, whereby, in the display area of the display device, a three-dimensional space is represented, whereby based on at least one data source, three-dimensional coordinates in the three-dimensional space represented are determined for the location of at least one virtual element, whereby the at least one virtual element is transformed into a two-dimensional depiction in the three-dimensional space that is represented in the display area of the display device, and whereby by means of the virtual element at least one first vehicle is marked, which is represented in the display area of the display device.

In addition, the present disclosure is directed to a device for representing at least one virtual element, with at least one display device with at least one display area.

Aside from that, the present disclosure is directed to a vehicle with a device for representing at least one virtual element.

BACKGROUND

With the constant further development of virtual and augmented reality technologies and applications, these have also found their way into automobiles. Augmented reality (AR) concerns the enrichment of the real world through virtual elements that are registered or located in their correct location in three-dimensional space and that allow real-time interaction. A possible technical realization to correspondingly enrich the driver's workspace with perspectively correct virtual augmentation is offered by the head-up display (HUD).

Specifically, with head-up displays the virtual display is created by means of an imaging unit integrated into the dashboard, such as a TFT display. This image is guided through multiple mirrors in the direction of the windshield, where the light is reflected in the driver's eye. The driver perceives this image as a virtual display in the visual field. In designing such systems the area in which the light is reflected is spatially limited in order to achieve greater brightness through less light scattering. This area is called an "eyebox", since the driver's focus must be in this area in order to enable perception of the virtual image.

DE 2018 204 254 A1, for example, offers a method for calculating the insertion of additional information for a display on a display unit that includes a head-up display. The additional information inserted may, for example, also be the marking of a vehicle ahead.

Augmented reality head-up displays (AR HUDs) visualize information in the driver's direct visual field. On the one hand, this allows, the communication of driver-relevant information without the need to divert one's gaze. On the other, these displays, not least due to the relatively narrow focus, may also be disruptive, since by definition they are displayed in the driver's relevant visual field. Therefore it is important to minimize the duration of displays. Ideally, the information should be displayed exactly when it is directly relevant for the driver.

DE 10 2011 007 329 A1, for example, discloses a method for operating a motor vehicle in which additional information is inserted for the driver of the vehicle by means of a head-up display. Here it is provided that in connection with an adaptive cruise control system, the sped is regulated dependent on the vehicle ahead. Here the vehicle ahead is marked by means of the display device if there is a risk that the cruise control system is assuming the wrong values for regulating the speed.

One disadvantage of the aforementioned prior art consists of the fact that it may not be clear to the driver why an error situation arises, so that it cannot be unequivocally determined why and how the driver should respond in this case.

SUMMARY

The present disclosure is thus based on the problem of specifying a method, a device and a vehicle in which the display area of a display device is used as efficiently as possible so that the driver of a vehicle is afforded a clear representation of the information needed and is not needlessly diverted, and that also enables the driver to correctly perceive dangerous situations.

In the present disclosure this problem is initially solved through the features recited in the claims herein by means of the fact that a first vehicle is marked, if a predefined speed gradient between the vehicle and the first vehicle is exceeded, or is not reached.

The display area of the display device may be a display in the central area or in the cockpit area, for example in the vehicle's instrument cluster. Alternatively or in addition, the display area of the display device may be configured as a head-up display. Head-up display is to be understood as a display area in which the driver can maintain his head position or his line of sight because the information is projected in his visual field, for example on the vehicle's windshield.

The three-dimensional space represented may preferentially describe an area outside the vehicle in the direction of travel. In a head-up display the display area of the display device or the three-dimensional space is to be equated with the view through the windshield. Consequently, the three-dimensional space is then the space in front of the vehicle in the driver's or passenger's focus. The three-dimensional coordinates correspondingly calculated to a virtual element may, for example, be Cartesian coordinates.

Accordingly, the first vehicle represented in the display area may be a vehicle that is in the vehicle's environment and either is represented virtually in the display area of the display device or, for example with the head-up display, is the actual first vehicle that is in the vehicle's environment and is represented in the display area of the display device. In the environment may mean that the first vehicle is in front of, next to or behind the vehicle.

The data sources needed for calculating the coordinates may take different forms. Preferentially, these data sources are vehicle data or navigation data that are recorded by the vehicle's positioning sensors, such as GPS, rotational rate sensors or cameras.

The virtual element may be various image elements and/or switch areas that are represented in the display area of the display device. The virtual elements may have a connection to vehicle data and/or be dependent on the vehicle's driving characteristics. The data may, for example, come from existing vehicle assistance systems. But it is also conceivable that the virtual elements represented are irrelevant for the vehicle's driving characteristics.

The marking of the first vehicle may be realized in various ways that are suitable to draw the driver's attention visually to the fact that the first vehicle was recognized. In addition it may also be communicated to the driver acoustically and/or haptically, for example through vibration on the steering wheel, that the first vehicle was recognized.

Pursuant to the present disclosure it is provided that the first car is marked if a predefined speed gradient between the vehicle and the first vehicle is exceeded. Thus the first vehicle is marked by means of the virtual element only when it is relevant to the driver of the vehicle. The speed gradient describes the momentary change in the relative speeds of the vehicle and the first vehicle. If the speed gradient changes, this may mean that the first vehicle is braking, by means of which there may be a risk of collision by the vehicle with the first vehicle. Therefore the driver of the vehicle is alerted to the fact that a change in the speed gradient was registered in that the first vehicle is marked by means of the virtual element. The driver of the vehicle can respond accordingly.

In the event that the marking of the first vehicle by the virtual element is linked to other assistance functions, for example to an adaptive cruise control, it is accordingly suggested to the driver that, for example, a braking action by the vehicle ahead was recognized.

Other preferential configurations of the present disclosure result from the other features cited in the subordinate claims.

In a configuration of the present disclosure, it is provided that the three-dimensional coordinates of the virtual elements are determined based on a distance measurement to the vehicle ahead as the first vehicle. In this manner data from the so-called "adaptive cruise control (ACC)" can be used. With this function users can, for example, choose from among five levels that each result in a different distance from the vehicle. Thus a vehicle ahead can be marked pursuant to the method as soon as it has been identified by the adaptive cruise control.

In this manner it is visually communicated to the driver of the vehicle that a vehicle ahead was recognized. Consequently, the driver of the vehicle receives feedback that the distance measurement is being correctly executed, whereby the confidence in the technology, which is otherwise not directly perceivable, is reinforced.

Alternatively or in addition, in another configuration, it may be configured where the three-dimensional coordinates of the virtual element are determined based on the time interval to the vehicle ahead as first vehicle. By means of time gap adjustment the driver of the vehicle can choose among, for example, five levels that each result in a different distance from the vehicle ahead. In accordance with the designation of time gaps, each level is defined by a specific time interval to the vehicle ahead, such as 1 s. The distance to be maintained, which may be represented in the display field of the display device as a contact-analogous line, is calculated from the actual speed as well as the time gaps. Other representations are also conceivable.

In a particularly preferential configuration, it may be configured where the vehicle ahead is marked as a first vehicle by means of the virtual element if it is represented in the display area of the display device. Here it is conceivable that the first vehicle is marked if it becomes visible in the display area of the display device. In the case of a head-up display this means that the first vehicle is moved perspectively from outside the "eyebox" into the area of the "eyebox". As soon as this is [0026] the case, the first vehicle can be marked by the virtual element so that the driver is alerted to the fact that the first vehicle was recognized.

In the case of a display area in which a camera image is represented, the first vehicle can accordingly be moved out of an area outside the visual field of the camera into the visual field and accordingly then marked by means of the virtual element.

In order not to unnecessarily divert the driver of the vehicle, in a further configuration, it may be configured where the first vehicle is marked over a predefined duration. Thus, the driver of the vehicle can initially be alerted to the fact that a first vehicle was registered in proximity to the vehicle. After an appropriate time, after which it can be assumed that the driver has registered the marking, the marking can then be removed. In this manner the display area of the display device remains clear for the driver of the vehicle.

Alternatively or in addition, in a further configuration, the first vehicle may be marked if a predefined difference between the relative speeds of the vehicle and the first vehicle is registered. In this manner the first vehicle is marked by means of the virtual element only if it is relevant to the driver of the vehicle. If the difference between the relative speeds of the vehicle and the first vehicle is too great, this may mean that the vehicle is significantly faster than the first vehicle. If the first vehicle is the vehicle ahead, this may mean that a collision may possibly be impending if the vehicle's speed is not regulated. The driver of the vehicle can then respond accordingly.

In the event that the marking of the first vehicle by means of the visual element is linked to other assistance functions, for example to the aforementioned ACC system, it is accordingly suggested to the driver that the vehicle ahead was recognized by the system.

Pursuant to a further configuration, the distance to the vehicle ahead may be recorded continually. The continual recording of the distance contributes to the fact that the distance between the first vehicle ahead and the vehicle can be controlled.

Moreover, in a further configuration, the distance to the vehicle ahead may be evaluated once per second, preferentially every 500 ms, particularly preferentially every 250 ms. By means of the evaluation it is possible, for example, to determine the aforementioned speed gradient and/or the relative speeds of the vehicle and the first vehicle or the vehicle ahead. Based on these evaluations the system can decide whether a marking of the vehicle by means of the virtual element in the display area of the display device is required.

In a further configuration, the vehicle ahead may be permanently marked. By means of permanent marking it is continually communicated to the driver of the vehicle that the vehicle ahead is being recognized and any linked assistance systems are accordingly working reliably. If no or few other virtual elements are displayed in the display area of the display device, this type of representation may make sense.

It is also conceivable that different setting options are provided in which, for example, only the marking of the first vehicle by means of the virtual element is represented as visible to the driver in the display area of the display device. Then, by switching the possible mode, other elements relevant to the driver can be represented in the display area of the display device. In this manner the flood of information in the display area of the display device is minimized. The driver is thus not unnecessarily diverted and can concentrate on driving the vehicle.

Various possibilities are conceivable by which the first vehicle can be marked by means of the virtual element. In one configuration of the method pursuant to the present disclosure it is provided that the first vehicle is marked circumferentially by means of the virtual element. A circumferential marking may, for example, be understood as encircling the first vehicle and/or drawing the contour of the first vehicle. Here, in addition, the first vehicle can be highlighted by means of brightening. The virtual element may have a color that contrasts starkly with the three-dimensional space represented so that it is clearly visible. It is also conceivable that the virtual element is highlighted by means of a general signaling color.

Alternatively or in addition, in a further configuration of the method pursuant to the present disclosure it may be provided that the virtual element has an orientation feature and that the orientation feature is oriented in the direction of the first vehicle. The orientation feature could, for example, be the point of a directional arrow. Accordingly the orientation feature is oriented in such a way that it is directed at the first vehicle.

Aside from that, the problem cited above is also solved by an aforementioned device for representing a virtual element with at least one display device, the display device may be configured to carry out a method pursuant to the present disclosure. The above statements concerning the method pursuant to the present disclosure also apply analogously to the device pursuant to the present disclosure.

The device may, for example, be a navigation system that allows for graphic output of virtual elements pursuant to the method pursuant to the present disclosure.

Preferentially it is provided in a first configuration of the device pursuant to the present disclosure that the display area of the display device is configured as a head-up display (HUD).

Moreover, the problem cited above is solved by a vehicle, whereby the vehicle includes a device pursuant to the present disclosure.

The above statements concerning the device pursuant to the present disclosure also apply analogously to the vehicle pursuant to the present disclosure.

Unless otherwise stated in an individual case, the various embodiments of the present disclosure cited in this application may advantageously be combined with one another.

BRIEF DESCRIPTION OF THE DRAWINGS

The present disclosure will hereinafter be explained in exemplary embodiments using the associated drawings. These show.

DETAILED DESCRIPTION

Figure 1:
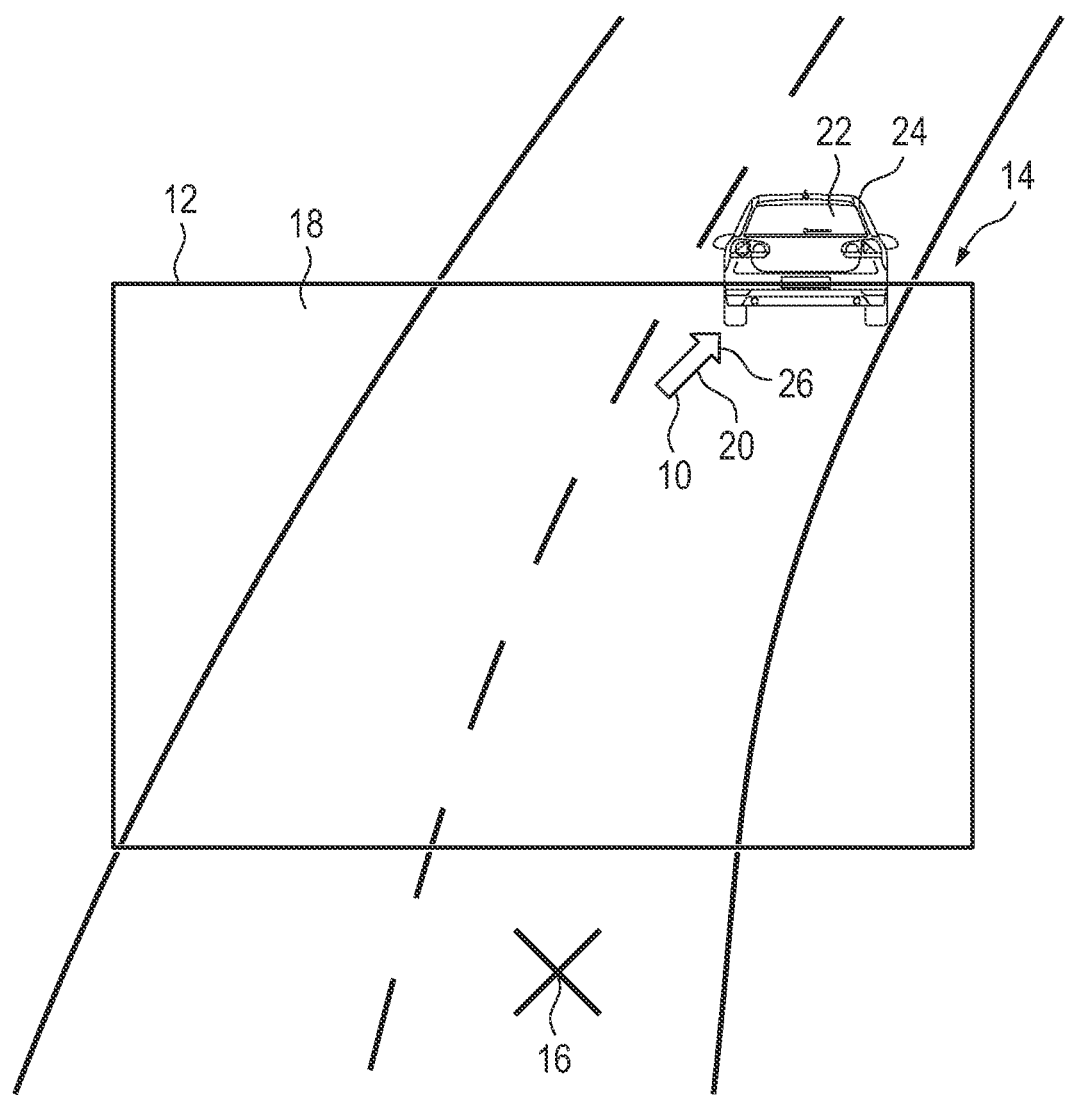
FIG. 1 illustrates a schematic representation of an exemplary embodiment of a method pursuant to the present disclosure for representing a virtual element.

FIG. 1 shows schematically the representation of a virtual element 10 in the display area 12 of a display device 14. In the display area 12, a three-dimensional space 18 is shown from the perspective of a vehicle 16. The virtual element 10 is represented, where possible in correct perspective, by a two-dimensional depiction 20 in the display area 12. For this, based on at least one data source, three-dimensional coordinates for the location of the virtual element 10 are determined. The three-dimensional coordinates should specify where exactly the two-dimensional depiction 20 must be located so that the most realistic possible impression is created that the two-dimensional depiction 20 is perceived as contact-analogous, e.g., as part of the environment.

In this exemplary embodiment the display area 12 of the display device 14 is configured as a head-up display. By means of the head-up display the driver of the vehicle 16 can maintain his head position or line of sight because the information is projected into his visual field on the vehicle's windshield. The three-dimensional space 18 represented in the display area 12 of the display device 14 in a head-up display is to be equated with the view through the windshield. Consequently, the three-dimensional space 18 is the space in front of the vehicle 16 in the driver's focus.

In FIG. 1 it may be seen that a first vehicle 22 in the display area 12 of the display device 14 is at least partially represented. In this case the first vehicle 22 is the vehicle 24 that is driving ahead of the vehicle 16. The first vehicle 22 is perspectively so far away from the vehicle 16 that in the display area 12 of the display device 14 it is represented so far above that the representation lies only partially in the display area 12.

In this exemplary embodiment, the virtual element 10 is configured as a directional arrow with an orientation feature 26 in the form of an arrow point. The directional arrow is oriented in the direction of the first vehicle 22 so that the arrow points to the first vehicle 22. In this exemplary embodiment of the method the virtual element 10 is used to mark a vehicle ahead 24 as soon as it can be represented at least partially in the display area 12 of the display device 14.

Figure 2:
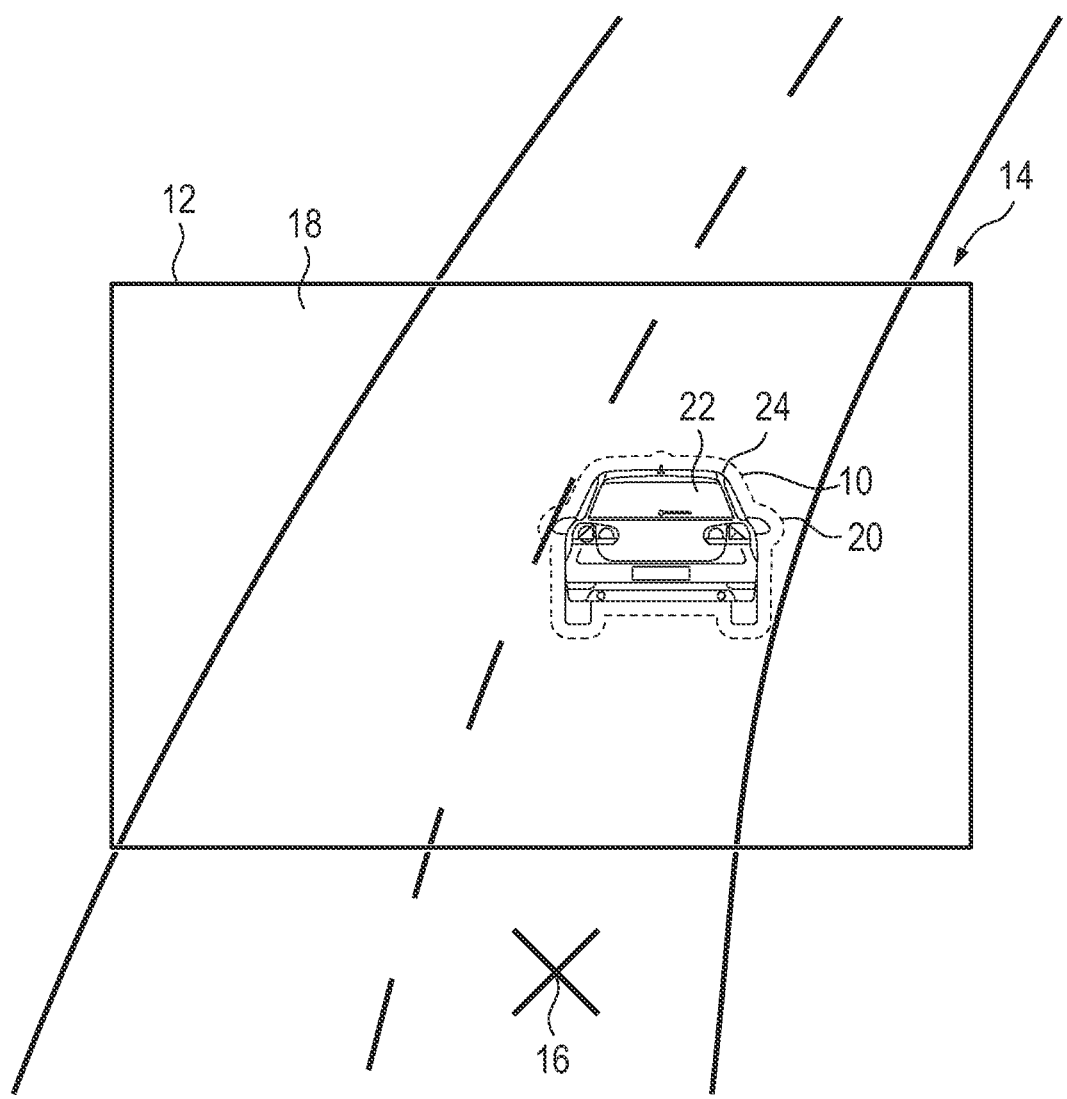
FIG. 2 illustrates a schematic representation of a further exemplary embodiment of the method pursuant to the present disclosure.

In FIG. 2 a further exemplary embodiment of the method pursuant to the present disclosure is represented. Analogously to FIG. 1, a first vehicle 22 or a vehicle ahead 24 is represented in the display area 12 of the display device 14. In contrast to FIG. 1, the first vehicle 22 is represented entirely in the display area 12 of the display device 14. In this exemplary embodiment the virtual element 10 is represented as bordering the first vehicle 22, so that the first vehicle 22 can be actively marked. In this manner it is made clear to the driver of the vehicle that a vehicle ahead 24 was recognized.

In the present case the distance between the vehicle 16 and the vehicle ahead 24 is continually measured. At time intervals of approx. 500 ms the data measured are evaluated. In addition, the so-called "adaptive cruise control (ACC)" assistance system is linked to the marking of the vehicle ahead 24 by means of the virtual element 10. With the adaptive cruise control it is possible for the driver to maintain required distances to the vehicle ahead 24. Here the appropriate distance to the vehicle ahead 24 and/or the time interval can be taken into account. By means of the time gap adjustment the driver of the vehicle 16 can, for example, choose from among five levels that each result in a different distance from the vehicle ahead 24. In accordance with the designation of time gaps, each level is defined by a specific time interval to the vehicle ahead 24, such as 1 s. The distance to be maintained, which may be represented in the display field of the display device as a contact-analogous line, is calculated from the actual speed as well as the time gaps. Other representations are also conceivable.

In combination with the marking of the vehicle ahead 24, through the adaptive cruise control a visualization of the vehicle ahead 24 recorded is made possible. Through the marking of the vehicle ahead 24 in combination with the adaptive cruise control, the driver of the vehicle 16 can understand that a vehicle ahead is being recognized by the assistance system.

In addition, in this exemplary embodiment the driver of the vehicle 16 has multiple options as to the extent to which the marking of the vehicle ahead 24 should take place. For one thing, the marking of the vehicle 16 can take place by means of the virtual element 10, as soon as a vehicle ahead 24 is recognized by sensors that use, among other things, the adaptive cruise control, and is at least partially represented in the display area 12 of the display device 14. Moreover, it is possible that the marking of the vehicle ahead 24 takes place only if a predefined difference from the relative speed between the vehicle 16 and the first vehicle 22 is registered.

In some examples, the vehicle ahead 24 may be marked by means of the virtual element 10 only if a predefined speed gradient between the vehicle 16 and the vehicle ahead 24 is exceeded. Thus the vehicle ahead 24 is marked by means of the virtual element 10 only if it is relevant for the driver of the vehicle 16. The speed gradient describes the momentary change in the relative speeds of the vehicle 16 and the vehicle ahead 24. If the speed gradient changes, this may mean that the vehicle ahead 24 is braking, by means of which there may be a risk of collision by the vehicle 16 with the vehicle ahead 24. Therefore the driver of the vehicle 16 is alerted to the fact that a change in the speed gradient was registered in that the vehicle ahead 24 is marked by means of the virtual element 10.

Due to the linking with the adaptive cruise control, the vehicle 16 is correspondingly slowed down on its own in order to continue to maintain the required distance of the vehicle 16 from the vehicle ahead 24. By means of the marking of the vehicle ahead 24 in the display area 12 of the display device 14, the driver is alerted to the fact that the adaptive cruise control has correctly registered the braking action of the vehicle ahead 24 and initiated appropriate countermeasures. In this manner the driver of the vehicle 16 is afforded the feeling of safety.

Figure 3:
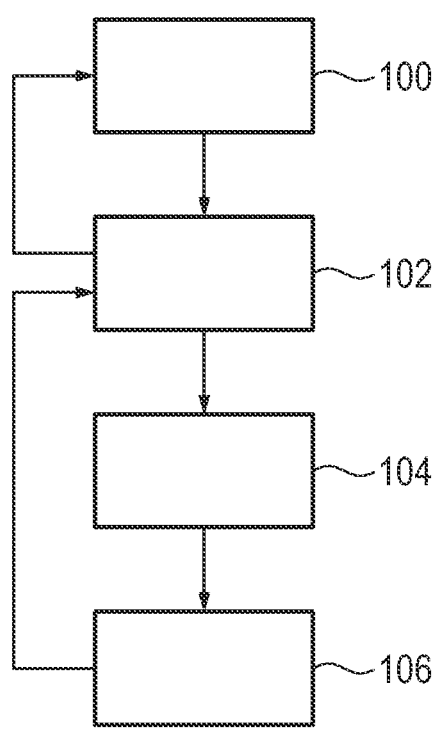
FIG. 3 illustrates a schematic representation of the sequence of an exemplary embodiment of the method pursuant to the present disclosure.

FIG. 3 shows the schematic representation of the step-by-step execution of an exemplary embodiment of a method pursuant to the present disclosure. In Step 100, using sensors or other available data, for example GPS data is recorded. In Step 102 the distance recorded and corresponding changes to the distance between the vehicle 16 and the vehicle ahead 24 are evaluated. If it is determined from the evaluation that there is no change to, for example, the aforementioned speed gradients, then the loop is continued and the distance in Step 100 between the vehicle 16 and the vehicle ahead 24 continues to be measured.

If a change to the speed gradients is determined, then in Step 104 it is verified whether the vehicle ahead is represented in the display area 12 of the display device 14. If this is the case, then the vehicle ahead represented in the display area 12 of the display device 14 is marked in Step 106 by means of a virtual element 10 so that the driver of the vehicle 16 is alerted to the fact that heightened attentiveness is needed.

The vehicle ahead 24 is marked as long as the corresponding precondition for the marking is fulfilled by the virtual element 10. As soon as, for example, there is no further change to the speed gradients and the potential danger situation is over, the marking of the vehicle ahead 24 can be removed by the virtual element 10, so that the driver of the vehicle 16 is not unnecessarily diverted by the display area 12 of the display device 14.

LIST OF REFERENCE NUMBERS

10 virtual element
12 display area
14 display device
16 vehicle
18 three-dimensional space
20 two-dimensional depiction
22 first vehicle
24 vehicle ahead
26 orientation feature

The invention claimed is:

1. A method for representing at least one virtual element in a display area of at least one display device of a vehicle, comprising:
  activating a three-dimensional space in the display area of the display device;
  based on at least one data source, determining three-dimensional coordinates in the three-dimensional space for a location of at least one virtual element relative to at least one first vehicle partially entering the display area;
  transforming the at least one virtual element as a two-dimensional depiction at the three-dimensional coordinate of the three-dimensional space;
  further transforming the at least one virtual element as a different two-dimensional depiction for marking the at least one first vehicle when it entirely enters the display area of the display device, wherein the first vehicle is marked if a predefined speed gradient between the vehicle and the first vehicle is exceeded or is not reached, and wherein the first vehicle is marked only if a predefined difference of the speed gradient between the vehicle and the first vehicle is registered.

2. The method of claim 1, wherein the three-dimensional coordinates of the virtual element are determined based on measuring the distance to the first vehicle.

3. The method of claim 1, wherein the three-dimensional coordinates of the virtual element are determined based on a time interval to a vehicle ahead as the first vehicle.

4. The method of claim 1, wherein the first vehicle is marked for a predefined duration.

5. The method of claim 2, wherein the distance to the first vehicle is continually recorded.

6. The method of claim 5, wherein the distance to the first vehicle is evaluated at least once per second.

7. The method of claim 1, wherein marking at least one first vehicle via the virtual element in the display area of the display device comprises encircling the first vehicle by the virtual element.

8. The method of claim 1, wherein the transformed virtual element comprises an orientation feature, comprising an orientation indicating a direction of the first vehicle as it partially enters the display area.

9. A system for representing at least one virtual element for a vehicle, comprising:
  a display device; and
  a processing apparatus, operatively coupled to the display device, wherein the display device and processing apparatus are configured to
  activate a three-dimensional space in the display area of the display device,
  based on at least one data source, determine three-dimensional coordinates in the three-dimensional space for a location of at least one virtual element relative to at least one first vehicle partially entering the display area, transform the at least one virtual element as a two-dimensional depiction at the three-dimensional coordinate of the three-dimensional space, and further transforming the at least one virtual element as a different two-dimensional depiction to mark the at least one first vehicle when it entirely enters the display area of the display device, wherein the first vehicle is marked if a predefined speed gradient between the vehicle and the first vehicle is exceeded or is not reached, and wherein the first vehicle is marked only if a predefined difference of the speed gradient between the vehicle and the first vehicle is registered.

10. The system of claim 9, wherein the three-dimensional coordinates of the virtual element are determined based on measuring the distance to the first vehicle.

11. The system of claim 9, wherein the three-dimensional coordinates of the virtual element are determined based on a time interval to a vehicle ahead as the first vehicle.

12. The system of claim 9, wherein the first vehicle is marked for a predefined duration.

13. The system of claim 10, wherein the distance to the first vehicle is continually recorded by the sensor.

14. The system of claim 13, wherein the distance to the first vehicle is evaluated at least once per second.

15. The system of claim 9, wherein the display device and processing apparatus are configured to mark at least one first vehicle via the virtual element in the display area of the display device by encircling the first vehicle by the virtual element.

16. The system of claim 9, wherein the transformed virtual element comprises an orientation feature, comprising an orientation indicating a direction of the first vehicle as it partially enters the display area.

* * * * *